United States Patent
Leclercq et al.

(10) Patent No.: US 6,823,538 B2
(45) Date of Patent: Nov. 30, 2004

(54) TOILET UNIT FOR A VEHICLE, IN PARTICULAR A RAIL VEHICLE

(75) Inventors: Bernard Leclercq, Famars (FR); Bernard Renaud, Wolfenbuttel (DE)

(73) Assignee: Alstom, Paris (FR)

(*) Notice: Subject to any disclaimer, the term of this patent is extended or adjusted under 35 U.S.C. 154(b) by 59 days.

(21) Appl. No.: 10/384,646

(22) Filed: Mar. 11, 2003

(65) Prior Publication Data

US 2004/0003461 A1 Jan. 8, 2004

(30) Foreign Application Priority Data

Mar. 28, 2002 (FR) .............................. 02 03911

(51) Int. Cl.[7] .................................................. A47K 4/00
(52) U.S. Cl. ........................................................ 4/664
(58) Field of Search .......................... 4/662, 663, 644, 4/209, 210, 211, 321, 323, 476, 477

(56) References Cited

U.S. PATENT DOCUMENTS

| | | | | |
|---|---|---|---|---|
| 2,817,091 A | * | 12/1957 | Painter | 4/664 |
| 2,817,846 A | * | 12/1957 | Stift | 4/664 |
| 3,594,825 A | * | 7/1971 | Reid | 4/663 |
| 4,718,131 A | | 1/1988 | Kitamura et al. | |
| 5,398,352 A | * | 3/1995 | Kordelin | 4/662 |
| 6,128,787 A | * | 10/2000 | Krist et al. | 4/300 |

FOREIGN PATENT DOCUMENTS

DE          24 48 980 A      4/1976

\* cited by examiner

Primary Examiner—Gregory L. Huson
Assistant Examiner—Huyen Le
(74) Attorney, Agent, or Firm—Sughrue Mion, PLLC

(57) ABSTRACT

A toilet unit for a vehicle, in particular a rail vehicle, the toilet unit comprising a cubicle equipped at least with a toilet pan or with a handbasin, said toilet unit defining a limiting volume that is in the shape of a rectangular block, and that is suitable for fitting into a space provided in the rail vehicle for this purpose, said toilet unit incorporating, inside said limiting volume, at least a clean water tank and a waste water retention tank, wherein said clean water tank and said waste water retention tank are disposed vertically in respective corners of the rectangular limiting volume, each tank having an outside wall that is wedge shaped to match the shape of the corner of the rectangular limiting volume, and an inside wall on its side that faces into the cubicle that substantially matches the shape of said cubicle.

6 Claims, 2 Drawing Sheets

TOILET UNIT FOR A VEHICLE, IN PARTICULAR A RAIL VEHICLE

BACKGROUND OF THE INVENTION

It is common to equip rail vehicles with toilet units, each such unit comprising a cubicle provided with equipment such as a toilet pan or a handbasin. Such toilet units are usually connected to tanks for clean water and for waste water retention disposed under the frame of the vehicle. Such a configuration with tanks separate and remote from the toilet unit suffers from the drawbacks of complicating installation of the toilet unit by requiring numerous connections, and also of requiring space on the vehicle underframe for the tanks.

U.S. Pat. No. 6,101,766 discloses a toilet unit incorporating a waste water retention tank in one of its side walls, and having a ceiling supporting a clean water tank. Such a toilet unit offers the advantage of having tanks that do not occupy space on the vehicle underframe, but it suffers from the drawback of requiring walls whose structure is sufficiently rigid to be capable of supporting the clean water tank which, because of its situation, is of small capacity and therefore connected to a water feed circuit of the train, making it complicated to install. Such a toilet unit also suffers from the drawback of having a cubicle whose headroom is limited by the size of the clean water tank. Finally, the configuration of such a toilet unit is such that, for a given limiting volume for the toilet unit, the waste water retention tank installed in one of the walls reduces the usable width of the cubicle accordingly.

OBJECTS AND SUMMARY OF THE INVENTION

Thus, an object of the present invention is to remedy these drawbacks by proposing a toilet unit of optimized configuration that incorporates all of the equipment necessary for it to operate, without significantly reducing the ergonomically usable space inside the cubicle.

To this end, the invention provides a toilet unit for a vehicle, in particular a rail vehicle, the toilet unit comprising a cubicle equipped at least with a toilet pan or with a handbasin, said toilet unit defining a limiting volume that is in the shape of a rectangular block, and that is suitable for fitting into a space provided in the rail vehicle for this purpose, said toilet unit incorporating, inside said limiting volume, at least a clean water tank and a waste water retention tank that are necessary to enable said toilet unit to operate, wherein said clean water tank and said waste water retention tank are disposed vertically in respective corners of the rectangular limiting volume, each tank having an outside wall that is wedge shaped to match the shape of the corner of the rectangular limiting volume, and an inside wall on its side that faces into the cubicle that substantially matches the shape of said cubicle.

In particular embodiments of the invention, the toilet unit of the invention may have one or more of the following characteristics taken in isolation or in any technically feasible combination:

the inside wall of each tank has a rounded shape;

the inside wall of each tank is circularly arcuate in shape;

the inside wall of each the tank matches the shape of a partition defining the cubicle;

the inside wall of each tank locally constitutes a partition defining the cubicle;

each of the tanks, namely the clean water tank and the waste water tank, extends over substantially the entire height of the limiting volume of the toilet unit.

BRIEF DESCRIPTION OF THE DRAWINGS

The objects, features, and advantages of the present invention will be better understood on reading the following description of various embodiments of the invention presented by way of non limiting example and with reference to the accompanying drawings, in which.

MORE DETAILED DESCRIPTION

To make the drawings clearer, only those elements which are necessary to understand the invention are shown.

Figure 1:
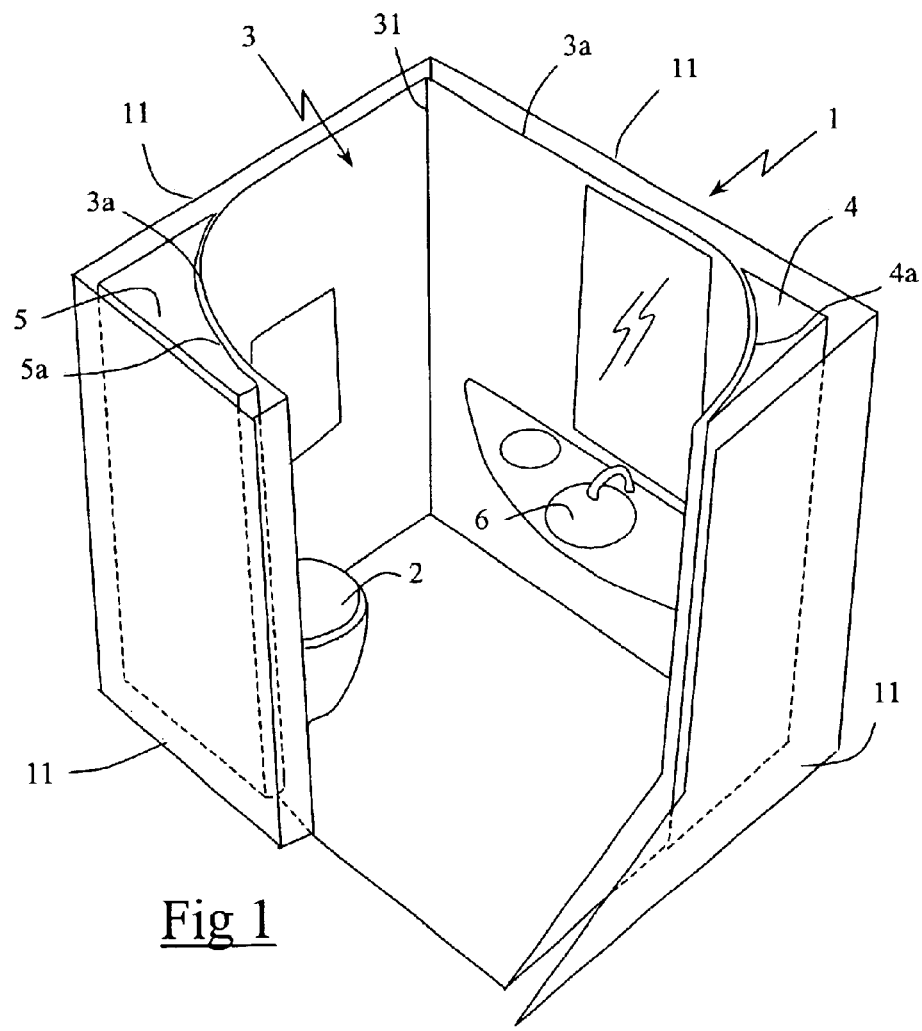
FIG. 1 is a partially cutaway perspective view of a particular embodiment of a toilet unit of the invention.

FIG. 1 shows a toilet unit designed to be installed in a rail vehicle. As shown in this figure, the toilet unit is designed to occupy a limiting outside volume 1 that is in the shape of a rectangular block, and that is defined by a set of side walls 11, this limiting volume being suitable for being received in a space provided in the rail vehicle for this purpose. Inside the limiting volume 1, the toilet unit comprises a cubicle 3 defined by two inner partitions 3a of arcuate shape, these inner partitions 3 being set back a little from the side walls 11 defining the limiting volume 1.

The inner partitions 3a are assembled together along two vertical edges 31 disposed in the vicinities of respective ones of two opposite corners of the rectangular limiting volume 1. In the vicinity of the respective edge 31, each inner partition 3a extends parallel to the adjacent side wall 11. Over the other two corners of the limiting volume 1, the inner partitions 3a are in the form of large-radius circular arcs so that a large amount of space is left between the arcuate portion of each inner partition 3a and the adjacent side walls 11.

In the invention, a clean water tank 4 and a waste water retention tank 5 are disposed in respective ones of the corners of the rectangular limiting volume 1 in respective ones of the two spaces left by the arcuate portions of the inner partitions 3a. These tanks 4 and 5 extend vertically and substantially over the entire height of the limiting volume 1, and each tank has an outer wedge shape that matches the shape of the corner formed by the side walls 11, and, on its opposite side, each tank has an inside wall 4a, 5a that matches the arcuate shape of the partition 3a defining the cubicle 3.

The clean water tank 4 and the waste water retention tank 5 are connected in known manner to a toilet pan 2 which is disposed inside the cubicle 3 against the arcuate portion of one of the two inner partitions 3a, the other partition receiving a handbasin 6 along its rectilinear portion, the handbasin being carried by a top panel which also extends over part of the arcuate portion of the partition 3a. A doorway, closable by a door 7, is provided in the rectilinear portion of the partition 3a that is disposed substantially facing the handbasin 6 in order to provide access to the cubicle 3.

Figure 2:
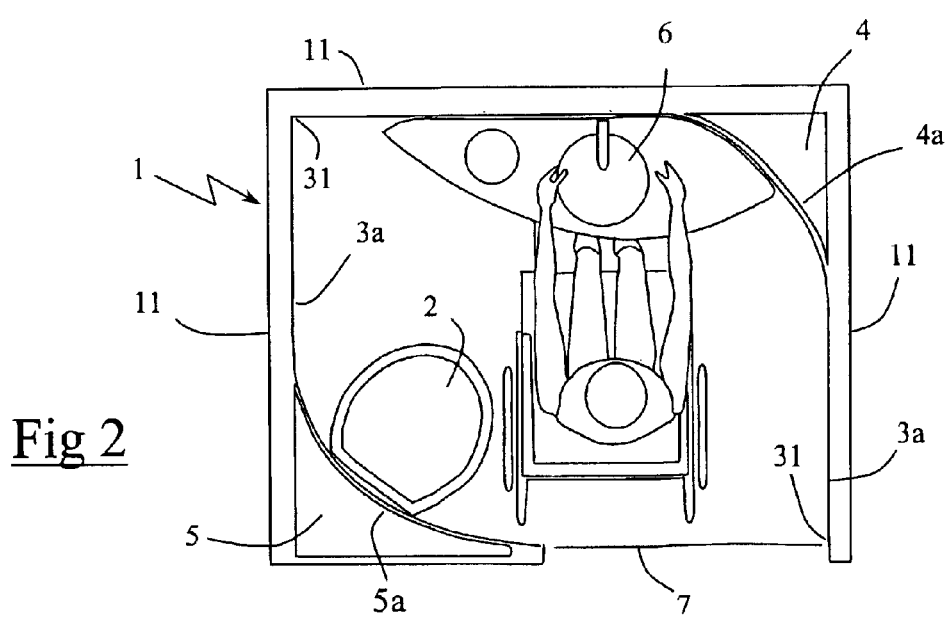
FIG. 2 is a plan view of the toilet unit of FIG. 1.

Elements not shown in FIGS. 1 and 2, such as piping, feed pumps, and heaters, and that are necessary to enable the toilet unit to operate properly are advantageously disposed in the space left between the inner partitions 3a of the cubicle 3 and the side walls 11 defining the limiting volume. Advantageously, the side walls 11 are provided with hatches enabling maintenance to be performed on these elements without disassembling the toilet unit.

Such a toilet unit offers the advantage of incorporating all of the elements necessary for toilet unit operation within a given limiting volume, without encroaching significantly on the ergonomically usable space inside the cubicle of the toilet unit. Such a toilet unit also offers the advantage of being in the form of an independent module that can be pre-assembled and tested outside the vehicle. Thus, such a toilet unit can be fitted as a single unit into the rail vehicle.

Figure 3:
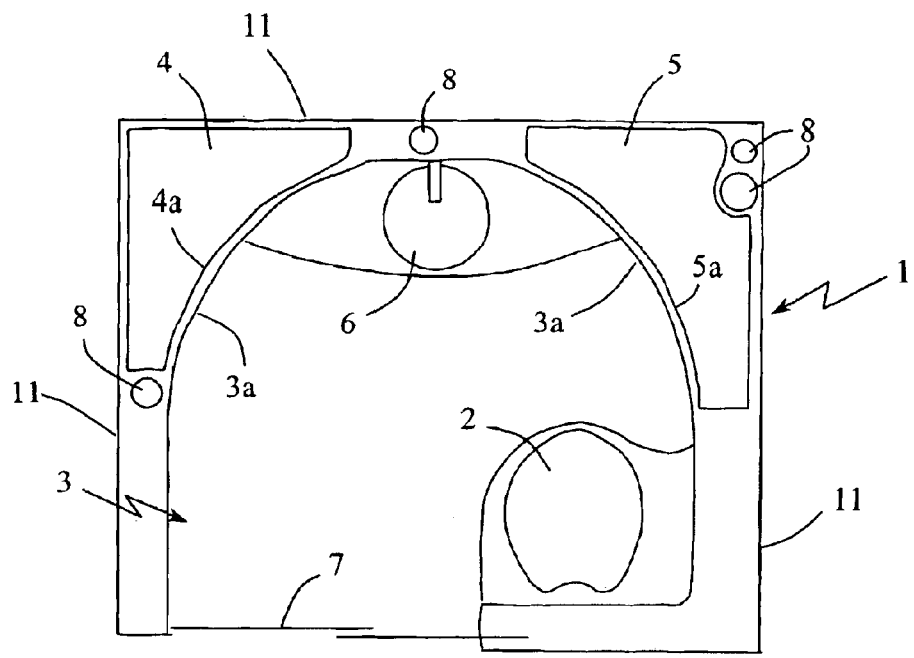
FIG. 3 is a plan view of a variant embodiment of the toilet unit of the invention.

FIG. 3 shows a variant embodiment of the invention, in which the toilet unit remains defined externally by a limiting volume 1 of rectangular shape, similar to the limiting volume of FIG. 1, and defined by side walls 11. This variant differs from the toilet unit of FIGS. 1 and 2 in that the clean water tank 4 and the waste water retention tank 5 are disposed in respective corners of the rectangular limiting volume 1 that are both situated on the same side, each of the tanks 4 and 5 having an outer wedge shape matching the shape of the corner of the limiting volume 1, and, on its other side, an inside wall 4a, 5a matching the shape of an inner partition 3a locally defining the cubicle 3 of the toilet unit. As shown in FIG. 3, the inner partitions 3a defining the cubicle 3 of the toilet unit extend over circular arcs facing the corners occupied by the tanks 4 and 5, and, outside these zones, they extend parallel to the side walls 11, while being set back a little therefrom.

In conventional manner, the cubicle 3 contains a handbasin 6, which, in this example, is disposed against the inner partition 3a extending between the two tanks 4 and 5, the inner partition 3a opposite from the handbasin 6 receiving firstly a toilet pan 2 in one corner and secondly a sliding door 7 giving access to the cubicle 3. Elements 8, such as piping, feed pumps, and heaters, necessary to enable the toilet unit to operate properly, are disposed in the space left between the inner partitions 3a of the cubicle 3 and the side walls 11 of the limiting volume 1.

Such a variant embodiment offers the advantage of optimizing ergonomics in a limited volume.

Figure 4:
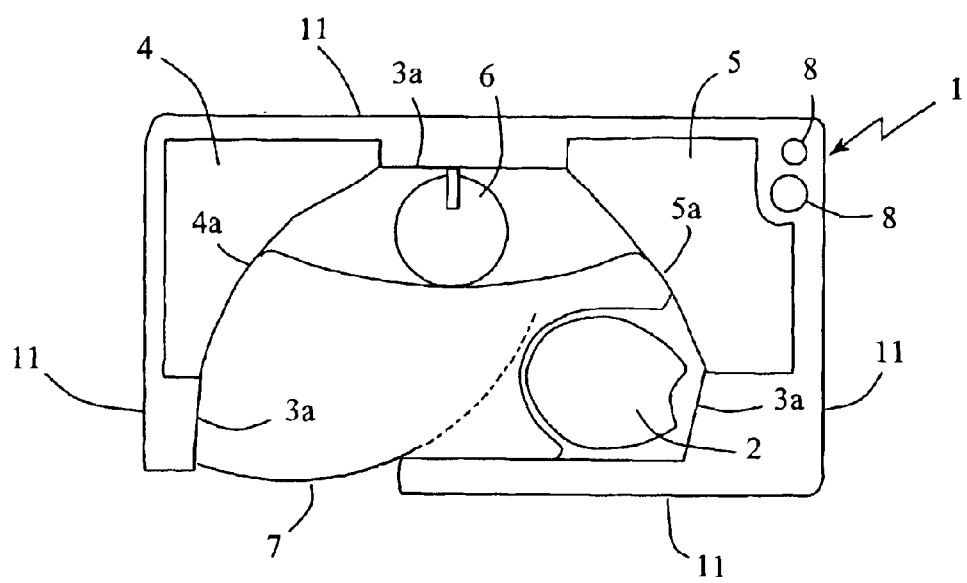
FIG. 4 is a plan view of another variant embodiment of the toilet unit of the invention.

FIG. 4 shows another variant embodiment of the invention, in which the rectangular limiting volume 1 of the toilet unit, defined by the side walls 11, is of small size. In this variant, the clean water tank 4 and the waste water retention tank 5 are disposed in respective ones of two corners of the rectangular limiting volume 1 that are both situated on the same side, each tank 4, 5 having an outer wedge shape that matches the shape of the corner of the limiting volume 1, and an arcuate inside wall 4a, 5a on its opposite side, said inside wall constituting an inner partition of the cubicle 3. The cubicle 3 is defined between the two tanks 4 and 5 by an inner partition 3a disposed in alignment with the arcuate inside walls 4a, 5a, and it is defined laterally by inner partitions 3a that extend substantially parallel to the side walls 11. A handbasin 6 is disposed against the inner partition 3a that extends between the two tanks 4 and 5, the opposite inner partition 3a receiving firstly a toilet pan 2 and secondly an arcuate sliding door 7 opening along a circular arc.

Elements 8, such as piping, feed pumps, and heaters, necessary to enable the toilet unit to operate properly are, as in the other embodiments, disposed in the space left between the inner partitions 3a and the side walls 11 of the limiting volume 1.

Naturally, the invention is in no way limited to the embodiments described and shown which are given merely by way of example. Modifications remain possible, in particular concerning the make up of the various elements, or the use of equivalent substitute techniques, without going beyond the scope of protection of the invention.

What is claimed is:

1. A toilet unit for a vehicle, in particular a rail vehicle, the toilet unit comprising a cubicle equipped at least with a toilet pan or with a handbasin, said toilet unit defining a limiting volume that is in the shape of a rectangular block, and that is suitable for fitting into a space provided in the rail vehicle for this purpose, said toilet unit incorporating, inside said limiting volume, at least a clean water tank and a waste water retention tank, wherein said clean water tank and said waste water retention tank are disposed vertically in respective corners of the rectangular limiting volume, each tank having an outside wall that is wedge shaped to match the shape of the corner of the rectangular limiting volume, and an inside wall on its side that faces into the cubicle that substantially matches the shape of said cubicle.

2. A toilet unit according to claim 1, wherein the inside wall of each tank has a rounded shape.

3. A toilet unit according to claim 2, wherein the inside wall of each tank is circularly arcuate in shape.

4. A toilet unit according to claim 1, wherein the inside wall of each tank matches the shape of a partition locally defining the cubicle.

5. A toilet unit according to claim 1, wherein the inside wall of each tank locally constitutes a partition defining the cubicle.

6. A toilet unit according to claim 1, wherein each of said tanks, namely the clean water tank and the waste water tank, extends over substantially the entire height of the limiting volume of the toilet unit.

* * * * *